May 2, 1961 J. T. BALL 2,982,478
LIQUID SPOUTING DEVICE
Filed Aug. 28, 1957
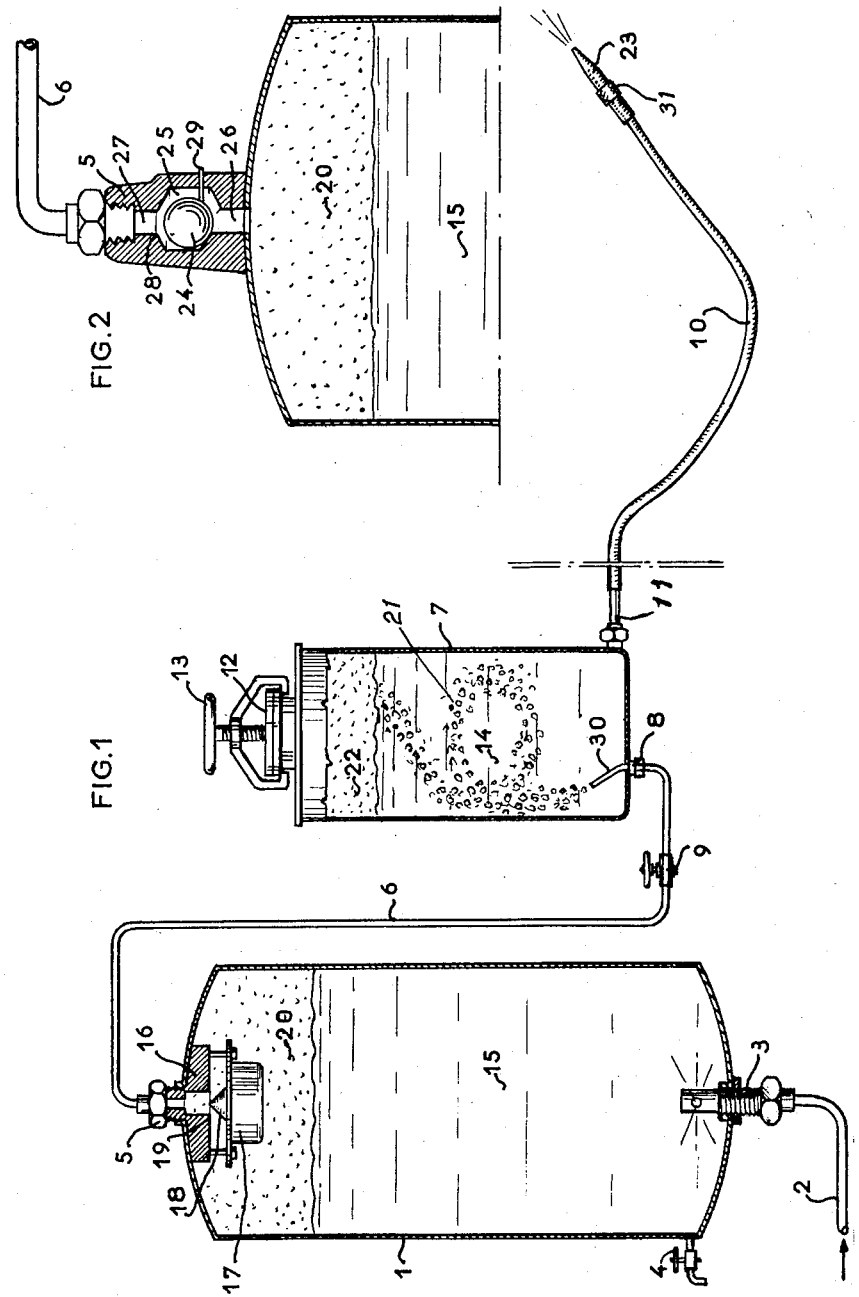
INVENTOR
Jeremy T. Ball

United States Patent Office 2,982,478
Patented May 2, 1961

2,982,478

LIQUID SPOUTING DEVICE

Jeremy T. Ball, 1390 Northlawn, Birmingham, Mich.

Filed Aug. 28, 1957, Ser. No. 680,870

13 Claims. (Cl. 239—11)

This invention relates to a device for spouting liquid fertilizers, insecticides, or the like, e.g., through a standard garden hose.

An object of the invention is to use a standard fresh water tap as a source of power, for spouting a liquid of the above-defined type.

Another object of the invention is to project the liquid to be spouted, exactly under the same conditions as ordinary water would be projected by a standard garden hose if the same were directly branched on the water tap.

With these objects in view, the invention consists in interposing a volume of air between the water discharged from the tap and the liquid mass to be spouted.

With this arrangement, the said volume of air can be first compressed by the tap water up to the tap output pressure, whereupon the liquid may be spouted under said pressure. Moreover, during the projection of the liquid, the tap water ensures continuous sustaining of the pressure of the compressed air, so that the liquid is projected under the water tap output pressure up to the last drop.

In other words, in the device according to the invention, three separate media are present, viz., the tap water (under pressure) which is used exclusively as a motive medium, the liquid mass to be projected under pressure as such, and a volume of air interposed between these two liquid media, so as to be compressed by the water and transmit the energy of the latter to the liquid. Neither water nor air are intended to be used as vehicles.

It is another object of the invention to additionally use the compressed air for agitating the liquid to be spouted.

Another object of the invention is to provide the water tank with valve means to prevent water from leaking towards the liquid container, once the compressed air in the water tank is exhausted.

Still a further object of the invention is to provide valve means for interrupting the intercommunication between the water tank and the liquid container, so as to permit using a water tank of smaller capacity and projecting the liquid content of the container in several successive operations, while preventing the remaining liquid from flowing into the water tank between said operations.

Incidentally, a further object of the invention is to provide the liquid container with a quick-removing lid.

Other objects and advantages of the invention will be apparent from the following detailed description, together with the accompanying drawings submitted for purpose of illustration only and not intended to limit the scope of the invention, reference being had for that purpose to the sub-joined claims.

In these drawings:

Fig. 1 is a diagrammatic view of a liquid spouting device according to the invention.

Fig. 2 shows an alternative construction of a detail.

As shown in Fig. 1, the spouting device according to the invention essentially comprises a water pressure tank 1, the bottom of which is fed with water through a pipe 2 and a pipe union 3 from a standard fresh water tap. A faucet 4 is provided near the bottom of tank 1 to permit evacuation of water from said tank without interruption of the connection with the feeding water tap. At its upper end, the tank 1 is provided with another pipe union 5 and communicates through a pipe 6 with the bottom of a liquid container 7, as shown at 8. The inner end of the duct 6 is located near the periphery of the container 7 and oriented obliquely and upwardly. A tap 9 is interposed on the pipe 6 to permit interruption of the intercommunication between the tank 1 and the container 7. A standard garden hose 10 is branched with the pipe union 11 at the bottom of the liquid container 7. A lid 12 which, in the example shown, is adapted to be removed by unscrewing of one single screw 13, permits closing the container 7, after having filled it with liquid. The liquid mass is shown at 14, and the water mass is shown at 15. A valve 16 is provided at the upper end of the water tank 1. As shown in Fig. 1, this valve is provided with a float 17 carrying a closing member 18 adapted to cooperate with a seat 19 to close the pipe union 5 when the float is lifted up, under the action of the mass of water 15, as the same reaches the upper end of the tank 1. However, in the position shown in Fig. 1, the float 17 is not immersed into the water mass, so that it holds the closing member 18 open by its own weight or, if required, under the action of a suitable spring, not shown.

The device is preferably operated as follows: the tank 1 being empty, as well as the container 7, the lid 12 is first removed and the container 7 is filled with the liquid 14 to be spouted. During this operation, the tap 9 is preferably closed, as well as the control valve (not shown) of the hose 10. Tap water is now admitted into the tank 1 during a time sufficient to compress the air mass 20 at a pressure equal to that of the water tap. The device is now ready to be used. The tap 9 is first opened to send compressed air from the air mass 20 to the lower end of the liquid mass 14 through which it then passes in the shape of bubbles 21 following a helical path to impart a swirling motion to the liquid, whereafter it forms a pressure head 22 at the top of the container 7. If now the control valve 31 of the hose 10 is opened, the nozzle 23 will spout the liquid contained in the container 7, exactly under the same pressure, as if it were water directly supplied to said hose from the water tap. In other words, the jet of liquid will be easily projected up to distances from 20 to 40 ft. These spouting conditions are extremely advantageous for the projection of insecticides, liquid fertilizers, or the like, to permit treating trees and plants with unparalleled efficiency which has never been attained by means of the usual spraying devices in which the liquid is suspended in a jet of air, so that it cannot be projected far enough.

In the case when one desires to project the whole content of the container 7 in one single operation, i.e., without replenishing the tank 1, the capacity of the latter must be sufficient to ensure the formation, at 20, of a mass of compressed air having a volume substantially equal to that of the liquid mass in the container 7.

If $V_1$ is the pressure tank capacity, $P_1$ the atmospheric pressure, $P_2$ the water tap pressure and $V_2$ the volume of the air mass 20 when fully compressed, the well known physics law, $P_1V_1 = P_2V_2$, gives:

$$V_1 = \frac{P_2 V_2}{P_1}$$

For example, if the volume of the small tank is 5 cu. ft., and if the tap water pressure is 45 p.s.i. gage, this formula gives (the atmospheric pressure being taken as equal to 15 p.s.i. and tap pressure 60 p.s.i. absolute):

$$V_1 = \frac{60 \times 5}{15} = 20 \text{ cu. ft.}$$

It may be seen that, in this case, the water tank should have a capacity equal to four times the volume of the liquid container.

In certain cases, it may be preferred to reduce the capacity of the water tank. This is one of the purposes of the tap 9. This tap permits, after having projected a part of the liquid mass contained in the container 7, to isolate the same from the water tank which may then be emptied and filled again, so as to constitute a new pressure head in view of projecting another part of the liquid mass.

It may be further pointed out that, once liquid is completely exhausted in the container 7, the compressed air will be projected through the hose nozzle and make a characteristic noise which indicates to the operator that the container is empty.

The float valve, shown in Fig. 1, has the drawback of reducing the water capacity of the tank 1.

In the alternative embodiment of Fig. 2, this valve has been replaced by a ball valve incorporated in the pipe union 5. This valve essentially comprises a ball 24 housed in a chamber 25 interposed between a lower port 26 communicating with the tank 1 and an upper port 27 which constitutes the outlet of the pipe union. The lower end of the upper port 27 constitutes a seat 28 for the ball 24, while the latter is prevented from seating on the upper end of the lower port 26, e.g., by means of a pin 29. On the other hand, the ball 24 is so designed that it can be seated at 28, only under the action of water 15, but not under the action of the compressed air from the air mass 20. With this arrangement in operation, the said compressed air will pass freely through the ports 26 and 27 to be sent through the pipe 6 into the liquid container 7. However, when the liquid from the said container will be completely exhausted, and when the water mass 15 will reach the ball 24, it will cause seating of the latter on the seat 28, which will prevent water from escaping towards the liquid container. On the other hand, the ball 24, normally resting on the pin 29 under the action of gravity, will not prevent air from entering into the tank 1 during emptying of the latter at the beginning of the operation.

While the invention has been described with particular reference to a preferred embodiment, it is not intended to limit the scope of the invention to the embodiment illustrated, nor otherwise than the terms of the subjoined claims.

What is claimed is:

1. A liquid spouting device comprising a normally closed liquid container for receiving a supply of liquid to be sprayed, said container having an air inlet, and having a liquid discharge outlet at the lower end thereof, a normally closed tank for receiving air and liquid, said tank having an air discharge outlet located at the upper end thereof and a liquid inlet located below said discharge outlet, a first conduit connecting said air outlet of said tank with the air inlet of said container, a second conduit operable for connecting said liquid inlet of said tank with a source of liquid under pressure greater than atmospheric pressure, and a liquid operable valve operably associated with said air outlet of said tank, said valve being normally maintained in open position whereby air under pressure of said liquid admitted to said tank may be discharged from said tank into said container and being operable to closed position by said liquid in said tank upon substantial filling thereof by said liquid, said tank having a volume sufficient to provide air under pressure to completely and continuously discharge all the liquid from said container under substantially constant pressure, said volume being at least equal to the volume of said container multiplied by the ratio of the numerical value of the liquid supply pressure to the pressure of the air in said tank before water pressure is applied thereto.

2. A liquid spouting device comprising means providing a pair of normally fluid tight chambers, one chamber for receiving a supply of liquid to be sprayed and the other for receiving atmospheric air and water, said one chamber having an air inlet and also having a liquid discharge outlet at the lower end thereof, said other chamber having an air discharge outlet at the upper end thereof and a water inlet located below said air discharge outlet, a first conduit connecting said air discharge outlet and said air inlet of said chambers, a second conduit for connecting said water inlet with a source of water under pressure greater than atmospheric pressure, and said other chamber having a volume in proportion to that of said one chamber which numerically is at least substantially equal to the ratio of the numerical value of the water supply pressure at said water inlet to the atmospheric pressure of the air in said other chamber.

3. A liquid spouting device comprising a pair of normally fluid tight chamber means of different volumes, the one of lesser volume to receive a supply of liquid to be sprayed, the other of greater volume to receive air and water, air conduit means interconnecting said pair of chamber means, said air conduit means having one end opening into said other chamber means adjacent the upper end thereof for conducting air therefrom and having its other end opening into said one chamber means for discharging air against the liquid therein, a second conduit means having one end opening into said other chamber means and having its other end connected with a source of water under pressure greater than atmospheric pressure for delivering water under pressure to said other chamber means to act upon the air therein, a water operable valve means operably associated with said air conduit means, said valve means being normally maintained in open position whereby air under pressure of said water delivered to said other chamber means from said source may be discharged from said other chamber means into said one chamber means under the substantially constant pressure of said water to displace liquid in said one chamber means therefrom, and spraying means connecting with said one chamber means adjacent the lower end thereof for spraying said liquid as it is displaced from said one chamber means by said air under pressure of said water, said valve means being operable to closed position during operation of said spraying means by said water delivered to said other chamber means upon predetermined filling thereof by said water.

4. A liquid spouting device as claimed in claim 3 wherein said air conduit means opens into said one chamber means adjacent the lower end thereof.

5. A liquid spouting device as claimed in claim 3 wherein said second conduit means is connected with said other chamber means adjacent the lower end thereof.

6. A liquid spouting device as claimed in claim 3, wherein said water operable valve means is in said air conduit means and comprises an interior chamber in said air conduit means having opposite ball valve receiving seats, one upstream from the connection of said air conduit means with said other chamber means and the other downstream of the connection of said air conduit means with said one chamber means, a ball valve operable in said interior chamber between said seats, and means for preventing seating of said ball valve on said upstream seat.

7. A liquid spouting device as claimed in claim 3 wherein said air conduit means has a valve intermediate said water operable valve means and the connection of said air conduit means with said one chamber means.

8. A liquid spouting device as claimed in claim 3 wherein said pair of chamber means are separate units.

9. A liquid spouting device as claimed in claim 3 wherein said spraying means comprises a conduit connecting with said one chamber means, a spray nozzle at the outer end of said conduit and control valve means operably associated with said conduit and nozzle.

10. A liquid spouting device as claimed in claim 3 including closure means on said one chamber means through which liquid to be sprayed may be introduced.

11. A liquid spouting device as claimed in claim 3 wherein said air conduit means opens into said one chamber means adjacent the lower end thereof; wherein said second conduit means is connected with said other chamber means adjacent the lower end thereof; and wherein said device includes a manually controlled valve in said air conduit means between said water operable valve means and the connection of said air conduit means with said one chamber means, a control valve in said spraying means, a normally closed inlet for introducing liquid to be sprayed into said one chamber means and a normally closed water drain adjacent the bottom of said other chamber means.

12. A liquid spouting device as claimed in claim 3 wherein said other chamber means has an initial transferable air supply sufficient to enable discharge of substantially all of said liquid from said one chamber means without replenishing the said air supply in said other chamber means.

13. A process for spraying liquids comprising providing a pair of confined spaces one of lesser volume than the other, placing in said one space a predetermined volume of liquid to be sprayed, the other space containing a gaseous medium, feeding water under a predetermined pressure greater than atmospheric pressure and substantially that at which the liquid is to be sprayed into said other space against said gaseous medium therein, directing said gaseous medium under pressure of said water from said other space into said one space, discharging liquid in said one space therefrom by spraying under the pressure of said gaseous medium backed up by said water pressure, continuing the feed of said pressurized water into said other space while spraying liquid from said one space whereby the pressure applied to said discharging liquid during all spraying is substantially equal and corresponds substantially to said predetermined pressure applied by said water on said gaseous medium and automatically stopping the transfer of said gaseous medium from said other space to said one space under control of said water in said other space upon predetermined filling of said other space with said water during said spraying operation.

References Cited in the file of this patent

UNITED STATES PATENTS

| | | |
|---|---|---|
| 77,286 | Hudson | Apr. 28, 1868 |
| 386,121 | Gauthier | July 17, 1888 |
| 858,602 | Hopkins | July 2, 1907 |
| 2,196,997 | Larson | Apr. 16, 1940 |
| 2,347,267 | Jowers | Apr. 25, 1944 |
| 2,356,950 | Root | Aug. 29, 1944 |
| 2,478,506 | Sappington | Aug. 9, 1949 |
| 2,626,740 | Levy | Jan. 27, 1953 |

FOREIGN PATENTS

| | | |
|---|---|---|
| 24,250 | Austria | May 10, 1906 |